Patented Jan. 23, 1934

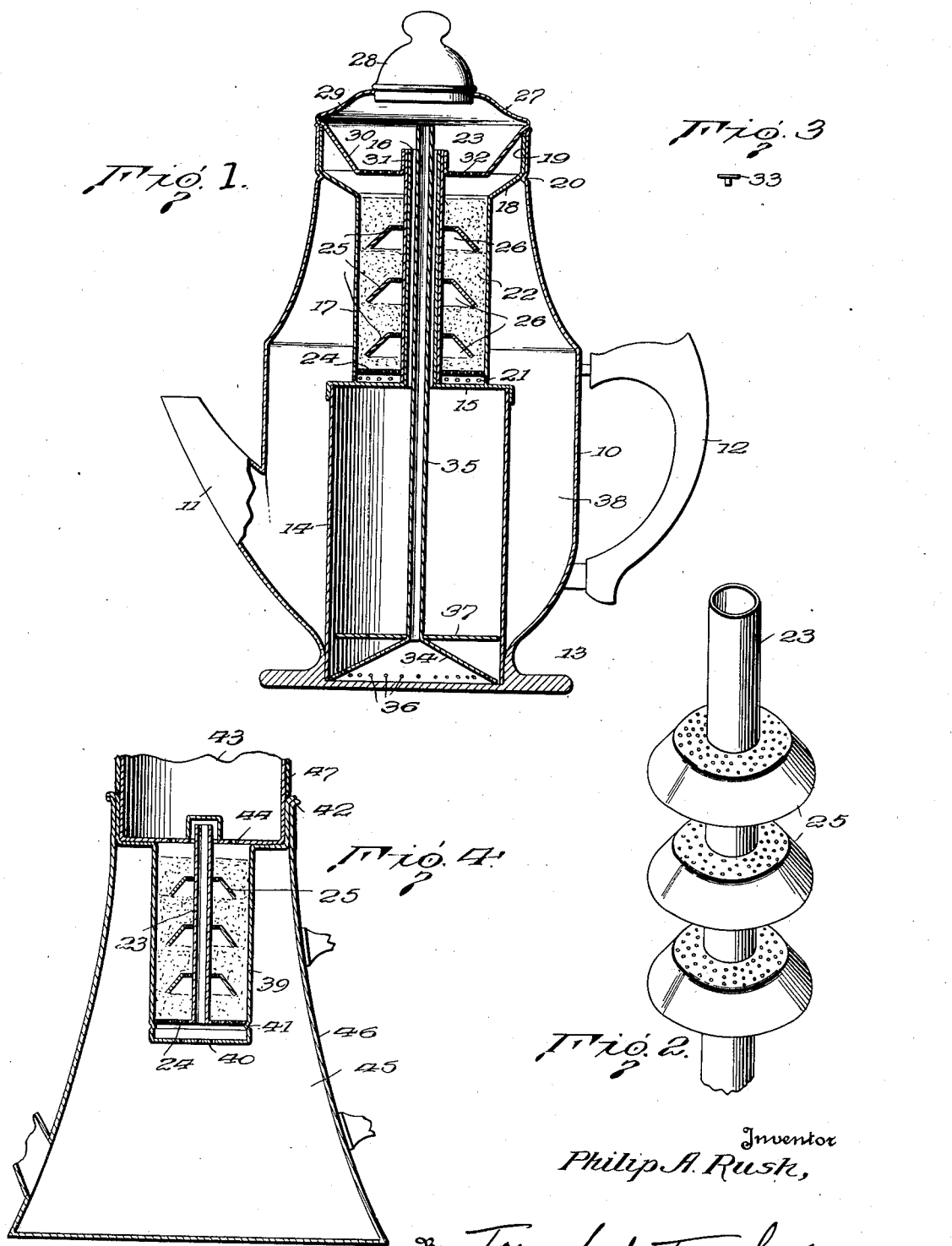

1,944,303

UNITED STATES PATENT OFFICE 1,944,303

COFFEE MAKING METHOD AND APPARATUS

Philip A. Rush, Memphis, Tenn.

Application November 6, 1929. Serial No. 405,204

8 Claims. (Cl. 53—3)

This invention relates to the art of making coffee, being concerned principally with a method and apparatus for producing coffee of desired strength by a single percolating operation, whereby the formation of injurious compounds, which is an inevitable result of the boiling and repercolating of coffee as commonly made, is prevented.

Domestic coffee percolators, in general household use at the present time, are of the repercolating type, wherein the boiling water is caused to circulate and pass through a coffee pack several times; at least twice. It is this repercolation which forms injurious compounds. My invention is of the true percolation type, that is, the boiling water passes once only through the coffee pack, the infusion thus produced being maintained out of contact with the coffee pack and the water being boiled in the percolating process.

In the practice of my invention boiling water is delivered to a coffee pack in drops at a relatively slow rate, and is caused to percolate therethrough in a defined path which is of considerable length with reference to the size of the percolator vessel. This increased travel of the water is brought about by a particular configuration of the coffee pack, which is arranged in a column so cubically proportioned with reference to the liquid capacity of the percolator vessel as to accomplish the desired results.

Objects of my invention are: to provide a novel method of making coffee in which water passes once only through a coffee pack; to provide a novel method of percolating coffee in a single percolation by passing the water through a body of coffee cubically so proportioned relative to the liquid capacity of the percolator vessel as to produce an infusion of necessary strength; to provide a novel method of percolating coffee wherein boiling water is delivered to a coffee pack at a relatively slow rate; to provide a method of maintaining the percolated product in a heated state through heat transfer from water boiled in the percolating process; to provide, in a coffee percolator, means for automatic interstitial adjustment of the coffee pack during percolation; to provide, in a coffee percolator, a novel coffee pack distributing and retaining means; to provide, in such a device, means for regulating the rate of water delivery to a coffee pack; to provide a novel percolator pump unit; and generally to provide novel structural elements and arrangements in a coffee percolator for carrying out the above noted objects. Other objects will be apparent to those skilled in the art.

This specification and the accompanying drawing, are illustrative of physical embodiments of the principles of my invention, constituting the best means I have thus far devised for carrying out the objects stated. In the drawing:—

Figure 1 is a vertical section through a percolator constructed in accordance with the principles of this invention.

Figure 2 is an enlarged fragmentary perspective of the coffee pack spacer and distributor means employed.

Figure 3 is an elevation of a plug element for regulating the rate of water feed to the coffee pack.

Figure 4 is a fragmentary vertical section of my novel coffee pack retaining means as employed in a drip process.

One form of percolating vessel in which the invention is practiced consists of a percolator container or pot 10 of suitable design, having a bottom spout 11 and a handle 12. The bottom 13 of the pot is flared and recessed internally to receive in tight fitting seated engagement a hollow cylinder 14 which extends upwardly in the pot to a point spaced slightly above the high point of the spout 11. The lower end of the cylinder 14 rests against the pot bottom 13.

The upper end of cylinder 14 is closed by a detachable cap 15 formed with a central upright tube 16, open at its upper end and open also at its lower end through the cap 15.

Forming an integral part of the cap 15 is an upright coffee pack holder in the form of a cylinder 17 having a diameter considerably less than that of the cylinder 14 and outwardly flared at its upper end in a funnel-like section 18 terminating in a vertical neck 19 which seats on an internal shoulder 20 formed on the wall of the pot 10, the wall of the pot continuing above the shoulder 20 concentric with the neck 19 and terminating substantially flush therewith at the top of the vessel. At its extreme lower end the coffee pack holder 17 is provided with an annular series of ports 21.

An important feature of this invention is the means by which a proper distribution and positioning of the ground coffee pack 22 is effected in the holder 17, enabling internal expansion of the coffee pack under swelling, whereby the pack automatically adjusts itself to remaain interstitial in character to a degree sufficient to assure continuous percolation therethrough. Such a means is embodied in the form of a hollow tube 23 slidably positioned in relatively tight fitting engagement over the tube 16, and being of a length co-extensive therewith.

Adjacent its lower end the tube 23 has rigidly secured thereon a strainer plate 24, circular in form and of a diameter sufficient to contact the wall of the holder 17. In service position the plate 24 lies just above the annular series of ports 21 in the bottom of the pack holder wall.

The tube 23 also carries one or more spaced substantially frusto-conical members 25 arranged above the plate 24. As shown best in Figure 1, these members 25 are rigidly attached to the tube 23 and are open at their under sides whereby to provide therebeneath a series of expansion spaces 26 at spaced intervals within the body of the coffee pack 22. The maximum diameter of the frusto-conical members 25 is appreciably less than the internal diameter of the coffee pack holder so that a clearance is provided around the peripheries of the members 25. The upper face portion of each member 25 is perforated to permit passage of water therethrough.

These members 25 function as distributors for properly positioning the ground coffee 22 in the pack holder 17 in the initial filling operation, as the coffee is poured in on the funnel section 18 of the pack holder. Further, due to their peculiar configuration, the coffee pack is automatically formed with internal expansion spaces as the pack holder fills up, as the depending inclined portions of the distributors 25 prevent the ground coffee from filling in therebeneath.

The lid 27 of the percolator pot 10 carries a conventional glass dome 28 and is formed of integral metal construction having a cover section 29 and a substantially dished spreader portion 30, the flat bottom of which is centrally apertured and formed with a sleeve portion 31 slidably engaged over the upper end of the tube 23 and terminating flush therewith. The bottom plate of the spreader 30 is formed with drip ports 32, and as a means of regulating the rate of water supply to the coffee pack, one or more of the drip ports may be closed as desired by plugging the same with stopper elements, one of which is shown as at 33 in Figure 3.

The cylinder 14, formed to hold the water to be boiled in the percolating process, contains a pump of the fountain type, the operating principle of which is well known. This pump consists of a substantially conical base plate 34 from the apex of which rises a hollow delivery tube 35 extending upwardly through the tube 16 in loose engagement and projecting above the end of the tube 16 well into the chamber formed beneath the dome 28 by the configuration of the cover section 29 and spreader portion 30 of the closure or lid 27.

Water from the reservoir cylinder 14 is admitted beneath the base plate 34 through an annular series of perforations 36 adjacent its bottom edge. As it is important that the rate of inlet through the perforations 36 be not too rapid, I provide means for retarding the down flow of the water in the reservoir cylinder 14. An embodiment of such a means consists of a substantially flat circular check plate 37 carried by the tube 35 above the base plate 34 and at the apex thereof. This check plate 37 is of a diameter slightly less than the internal diameter of the reservoir cylinder so that water may only pass below the check plate through the small peripheral clearance thus provided.

In the operation of the percolator the lid 27 is removed and the desired amount of ground coffee is poured in the open top on the funnel section 18 whereupon it automatically positions itself in the pack holder 17 by reason of the distributor members 25, assuming the outline as shown in Figure 1 with the expansion spaces 26 automatically formed internally of the coffee pack. The desired amount of water having been placed in the boiling chamber comprising the reservoir cylinder 14, the closure is replaced and the vessel is then placed over a suitable heat source. If desired, the water may be placed through a small funnel to be inserted in the top of the upright tube 16, after the positioning of the coffee pack holder 17, and without the necessity of removing the latter. As the water boils beneath the base plate 34 of the fountain pump, it will be delivered through the tube 35 to the spreader 30 and will trickle down through the drip ports 32 onto the top of the coffee pack 22. As the operation continues the boiling water will percolate down through the cylindrical column of coffee and will pass out through the strainer plate 24 at the bottom of the coffee pack flowing outwardly through the ports 21 into the coffee chamber 38 which surrounds the reservoir cylinder 14. It is obvious that at no time will the infusion in the chamber 38 come in contact with the water being boiled in the chamber 14, so that a repercolation is positively prevented.

In order to secure best results in the single percolating operation the height of the cylindrical coffee pack 22 in the holder 17 should be not less than twice the diameter of the pack as represented by the internal diameter of the holder 17. The rate of drip through the ports 32 may be controlled by plugging a desired number of ports with the stopper elements, one of which is shown in Figure 3. Inasmuch as it is not desirable to have too rapid a percolation and as heat conditions will not always be uniform, resulting often in rapid boiling and too rapid a delivery of water to the spreader 30, I have provided a positive automatic regulating means for limiting the maximum level of water in the spreader chamber. This is accomplished by the co-extensive length of the tubes 16 and 23, which together with the sleeve portion 31 of the spreader terminate at their upper ends in a common horizontal plane which is disposed beneath the upper end of the fountain tube 35. By reason of this construction and the loose disposition of the tube 35 through the tube 16, there can be no possibility of water collecting in the spreader above the plane common to the tops of the tubes 16 and 23, as when this occurs, there will be an overflow down through the tube 16 back to the water chamber.

After the infusion from the coffee pack is delivered to the chamber 38 it is maintained in a highly heated state by the transfer of heat from the wall of the reservoir cylinder 14, which cylinder derives its heat from water being boiled therein in the percolating process and also from steam originating therein after percolation has ceased. This is an important feature of the invention as it assures a constantly heated product.

In Figure 4 there is shown an adaptation of the coffee pack holder for use in connection with the drip process. In this modification the coffee pack cylinder 39 has a perforated bottom 40 and the side walls of the holder are formed with an internal annular ridge 41 spaced slightly above the bottom to receive the strainer plate 24, the tube 23 having the distributor elements 25. This structure is identical with that shown in Figures 1 and 2, the same reference numerals being employed to designate like parts.

In this form of the invention the upper end of the coffee pack holder 39 is shaped to extend upwardly and engage over the rim 42 at the top of the coffee pot proper. A container 43 which is filled with boiling water is seated over the open top of the coffee pack holder and is provided with a perforated bottom plate 44 through which the boiling water is allowed to drip onto the coffee pack and from thence downwardly through the perforated bottom plate 40 into the coffee chamber 45 comprised within the port 46. A suitably designed hood or cover 47 is disposed over the exterior of the boiling water container 43 and rests with its lower edge seated on the rim 42 of the coffee pot.

With the exception of the handle 12 and the glass dome 28 all parts of the percolator are made of light metal construction, aluminum or an aluminum alloy being preferred. All parts of the percolator are accessible for assembly and dismantling through the relatively wide top of the pot and the present construction dispenses with the conventional hinge connection of the pot lid with the body of the pot. In this embodiment of my invention the lid 27 does not have a hinged connection with the pot 10 but is frictionally retained in position by engagement of the collar 31 over the tube 23. This construction serves to secure the lid in position against accidental dislodgment when the pot is tilted in pouring coffee therefrom.

By removal of the fountain pump and the lid 27, the pot is adaptable for use as a drip process pot, for with these elements removed, a boiling water container of the type indicated at 43 in Figure 4, may be positioned in the top of the pot 10 whereby the water is allowed to percolate down through the coffee pack, the infusion passing to chamber 38 in which it is kept hot by causing boiling of water in the cylinder 14.

If desired, the strainer plate 24 at the bottom of the tube 23 may be made separate therefrom and individually mounted in the assembly and, with few changes the structure may be adapted to repercolating processes. Various structural changes and modifications may be made as desired and I desire it to be understood that the embodiments disclosed in this specification do not constitute limitations upon the scope of the invention, it being within the province of my invention that any desired changes and modifications in structural details and materials may be made so long as the same fall within the scope of the invention as claimed.

I claim:

1. In a coffee percolator, a fountain pump, a spreader member associated with the delivery end of said pump and having a plurality of drip ports therein, a coffee pack supported beneath said spreader member, and detachable stopper means for said ports for selectively controlling the rate of delivery of water from said spreader member to the coffee pack.

2. The combination with a coffee pack holder, of means adapted to be detachably positioned therein for directing the positioning of ground coffee disposed in said holder, said means including a frusto-conical member having an open under face and spaced from the walls of the holder.

3. The combination with the coffee pack holder of a percolating apparatus, of a tube adapted to be positioned vertically within the coffee holder, a strainer plate associated with the lower end of said tube, and a plurality of perforated frusto-conical members rigidly attached at spaced intervals on said tube with the peripheries thereof in spaced relation internally from the walls of the coffee pack holder, said frusto-conical members having open under faces.

4. Coffee making apparatus comprising a pot, a water boiling chamber disposed therein, a coffee pack holder supported on the top of said water chamber, a cover for said pot and having a water chamber formed therein, a fountain pump in said water boiling chamber and extending upwardly through said coffee pack holder into the water chamber of said cover, means in said cover for regulating delivery of water therefrom to the coffee pack holder, and means in the water chamber of said cover operating automatically to prevent an accumulation of water therein above a predetermined level.

5. A coffee percolator comprising a pot, a substantially cylindrical water boiling chamber therein and extending from the pot bottom substantially midway to the top, a substantially cylindrical coffee pack holder seated on said water chamber and extending substantially to the top of the pot, the mean diameter of said pack holder being substantially less than one half of its height, and means for delivering water boiled in said chamber to the top of said pack holder.

6. In a coffee percolator, a substantially cylindrical container for comminuted coffee, a plurality of substantially frusto-conical members in said container and spaced apart axially thereof, and means connecting and supporting said members in said container, the peripheral edges of said members being spaced from the container walls.

7. In a coffee percolator, a water chamber, a fountain pump in said chamber and extending through the top thereof, a water spreader associated with said fountain pump at the top of the percolator, a coffee pack holder surrounding said fountain pump intermediate said water chamber and spreader member, a bottom on said pack holder and forming the top of said water chamber, a tube in said pack holder and concentric with the fountain pump, and coffee spacer members fixedly mounted on said tube and spaced from the side walls of the pack holder.

8. A percolator fountain pump comprising, a conical base, a water delivery tube extending upwardly from the apex thereof, said base being open at its bottom and having a series of water inlet ports arranged in its wall above the bottom edge, and a baffle plate on said tube at the apex of the base and extending laterally of the tube above said inlet ports.

PHILIP A. RUSH.